Figure 1:
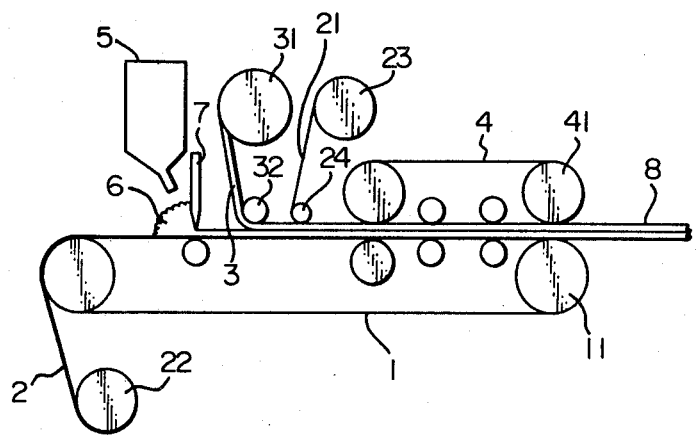

United States Patent [19]

Kanamori et al.

[11] 4,434,023
[45] Feb. 28, 1984

[54] METHOD FOR PRODUCING PLATE HEATER

[75] Inventors: Kozo Kanamori, Kusatsu; Akio Ishimoto, Kashihara; Masaaki Konishi; Hitoshi Maita, both of Uji; Hiroshi Shimoyama, Urawa, all of Japan

[73] Assignee: Sekisui Kagaku Kogyo Kabushiki Kaisha, Osaka, Japan

[21] Appl. No.: 324,853

[22] Filed: Nov. 25, 1981

[30] Foreign Application Priority Data

Nov. 29, 1980 [JP] Japan .................................. 55-168660

[51] Int. Cl.³ .......................... B32B 31/12; B32B 5/28
[52] U.S. Cl. .................................... 156/307.3; 29/830; 29/842; 156/332; 174/68.5; 219/541; 219/553; 428/332; 428/408; 428/430
[58] Field of Search ............... 156/307.3, 307.4, 332; 219/541, 553; 428/408, 332, 430; 523/512; 29/830, 842; 174/68.5

[56] References Cited

U.S. PATENT DOCUMENTS 3,987,230 10/1976 Gaku et al. ................. 156/307.4 X
4,229,328 10/1980 Makino et al. ................ 523/512 X
4,243,460 1/1981 Nagler ......................... 156/155 X
4,330,704 5/1982 Jensen ......................... 219/541 X

FOREIGN PATENT DOCUMENTS 55-100690 7/1980 Japan .

*Primary Examiner*—Robert A. Dawson
*Attorney, Agent, or Firm*—Wenderoth, Lind & Ponack

[57] ABSTRACT

A method for producing a plate heater, which comprises
preparing a mixture by dispersing electrically conductive fibers in a resin composition comprising a thermosetting resin, a curing agent and a thickener,
laminating the resulting mixture to a first sheet-like material capable of being impregnated with said resin composition to thereby impregnate a part of the resin composition in said first sheet-like material, and thickening the resin composition to form a sheet-like preform,
laminating a second sheet-like material capable of being impregnated with said resin composition to the mixture-laminated surface of the sheet-like preform, and
heating the laminated assembly under pressure to cure the thermosetting resin composition.

11 Claims, 2 Drawing Figures

METHOD FOR PRODUCING PLATE HEATER

This invention relates to a method for producing a plate heater.

Plate heaters have previously been known which are produced by mixing a synthetic resin with an electrically conductive material such as a metal powder, metallic fibers, carbon powder and carbon fibers, and molding the mixture. A method for producing a plate heater by making a sheet-like preform from a thermosetting resin and electrically conductive fibers such as metallic fibers and carbon fibers and then molding the preform under heat and pressure is advantageous because the production is easy and the product has a smooth surface and high strength.

Japanese patent application No. 6841/1979 filed Jan. 23, 1979, now laid open as Laid-Open Patent Publication No. 100690/1980, whose inventorship partly overlaps that of the present application discloses a method of making a panel heater which comprises laminating a resin composition composed of a thermosetting resin and a filler and electrically conductive fibers dispersed therein to a glass fiber layer, pressing the laminate from above to impregnate the glass fiber layer with the thermosetting resin and the filler, and then curing the thermosetting resin.

Another conventional method for producing a plate heater comprises laminating a thermosetting resin composition containing electrically conductive fibers dispersed therein to a glass fiber layer, pressing the laminate to impregnate the resin composition in the glass fiber layer to form a conductive fiber layer on one surface of the glass fibers layer, increasing the viscosity of the resin composition to make a sheet-like preform, laminating an electrically insulating sheet onto the conductive fiber layer of the preform, and then curing the resin composition under heat and pressure.

These prior art methods, however, have the defect that because the conductive fibers move within the resin during the pressing operation and are locally dispersed, the plate heater obtained does not permit uniform generation of heat over its entire surface, and that plate heaters having a predetermined amount of heat generation cannot be produced with good reproducibility.

It is an object of this invention therefore to remove the aforesaid defects of the prior art and to provide a method for producing with good reproducibility plate heaters which permit uniform generation of heat throughout their entire surface and generate a predetermined amount of heat.

According to this invention, there is provided a method for producing a plate heater, which comprises preparing a mixture by dispersing electrically conductive fibers in a resin composition comprising a thermosetting resin, a curing agent and a thickener, laminating the resulting mixture to a first sheet-like material capable of being impregnated with said resin composition, to thereby impregnate a part of the resin composition in said first sheet-like material, and thickening the resin composition to form a sheet-like preform, laminating a second sheet-like material capable of being impregnated with said resin composition to the mixture-laminated surface of the sheet-like preform, and heating the laminated assembly under pressure to cure the thermosetting resin composition.

In the method of this invention, the resin composition in the mixture is impregnated in the first sheet-like material during the making of the sheet-like preform, and is further laminated to, and impregnated in, the second sheet-like material before heating the laminated assembly under pressure. In other words, the aforesaid mixture is filtered by the two sheet-like materials, and as a result, the conductive fibers are uniformly dispersed between the two sheet-like materials to provide an electrically conductive layer having a high content of electrically conductive fibers.

Since this layer is heat-cured under pressure between the two sheet-like materials, the conductive fibers are protected by the sheet-like materials, and do not move even when pressed. Consequently, the electrically conductive fibers are uniformly dispersed throughout the mixture layer, and the method of the invention affords plate heaters capable of generating heat uniformly throughout their surface with good reproducibility. Furthermore, the plate heater obtained by the method of this invention has high strength because the sheet-like materials are laminated to both surfaces of the mixture layer. Moreover, the resulting plate heater has a smooth surface because the curing of the resin composition is effected under pressure.

The thermosetting resin used in this invention is an irreversible resin which is liquid at ordinary temperature and cures when heated. Examples of suitable thermosetting resins include unsaturated polyester resins, phenolic resins and epoxy resins, and the unsaturated polyester resins are preferred.

The curing agent used in this invention acts as a catalyst for the thermosetting resin. Examples include tertiary butyl perbenzoate, tertiary butyl peroxide, cumene hydroperoxide, dicumyl peroxide, benzoyl peroxide, and 1,1-ditert.butylperoxy-3,3,5-trimethyl-cyclohexane. Preferably, the curing agent is added in an amount of 0.5 to 2.0 parts by weight per 100 parts by weight of the thermosetting resin.

The thickener used in the invention is a compound which when added to the thermosetting resin, gives a blend whose viscosity gradually increases with time. Examples of the thickener are magnesium oxide, magnesium hydroxide, calcium hydroxide and zinc oxide, and magnesium oxide is preferred. The amount of the thickener may be properly determined depending upon the manufacturing conditions. Preferably, it is 0.3 to 5.0 parts by weight per 100 parts by weight of the thermosetting resin.

The resin composition used in this invention is composed of the thermosetting resin and the curing agent and thickener dispersed therein. If desired, the resin composition may further contain fillers, coloring agents, etc. which are usually added to thermosetting resins. Examples include calcium carbonate, titanium oxide, clay, talc, mica, alumina, magnesium carbonate and barium sulfate.

The electrically conductive fibers used in this invention preferably have a specific volume resistivity of not more than $10^{-2}$ ohms-cm. Examples of the conductive fibers are stainless steel fibers, aluminum fibers, and carbon fibers. The carbon fibers are preferred.

The length of the conductive fibers is preferably within the range of 0.3 to 25 mm. If the length is larger than the specified limit, the fibers are difficult to disperse uniformly in the thermosetting resin, and if it is smaller than the specified limit, the conductivity of the fibers is reduced. The especially preferred length of the conductive fibers is in the range of 3 to 10 mm. The diameter of the conductive fibers is preferably not more than 50 microns on an average because if it is larger than the specified limit, the conductive density of the fibers becomes non-uniform.

The amount of the electrically conductive fibers is not particularly limited, and may be determined properly depending upon the desired amount of heat generation of the plate heater. Preferably, they are added in an amount of 0.1 to 5 parts by weight per 100 parts by weight of the resin composition. If the amount of the fibers is larger than the specified limit, the fibers tend to be non-uniformly dispersed in the resin composition.

The sheet-like materials used in this invention should have the property of being impregnated with the aforesaid resin composition. Preferably, they have electrical insulation and heat resistance. For example, they may be woven and non-woven fabrics of glass fibers, natural fibers, synthetic fibers, etc. Fabrics of glass fibers, such as glass roving cloths, glass mats, glass papers, continuous glass strand mats and chopped glass strand mats are preferred.

Preferred glass fibers have a single fiber diameter of 5 to 30 microns, a fiber density of 30 to 1000 g/m$^2$, and an air permeability, as a sheet, of at least 100 cc/cm$^2$·sec (at a static pressure of 0.25 mmH$_2$O).

According to the method of this invention, the mixture obtained by dispersing the conductive fibers in the resin composition is laminated to a first sheet-like material capable of being impregnated with the resin composition. As a result, a part of the resin composition in the mixture is impregnated in the sheet-like material, and with the lapse of time, the viscosity of the resin composition increases. Since a part of the resin composition is impregnated in the sheet-like material, the proportion of the conductive fibers in the mixture layer increases.

The lamination may be effected by any desired methods, for example a method comprising coating the mixture on the sheet-like material by a knife coater, a roll, etc., or a method comprising coating the mixture by a knife coater, a roller, etc. on a sheet having no impregnatability such as a polyethylene or polypropylene sheet and laminating the sheet-like material on the aforesaid sheet. Impregnation gradually proceeds when the laminate is left to stand, but to perform the impregnation rapidly and uniformly, it is preferred to press the laminate by a roll, a press, etc. During the lamination, the resin composition is impregnated in the sheet-like material and gradually increases in viscosity. Thus, a sheet-like preform is produced.

In the next step of the method of this invention, a second sheet-like material capable of being impregnated with the resin composition is laminated to the mixture laminated surface of the sheet-like preform. The laminated assembly is heated under pressure to cure the resin composition. During this laminating step, a part of the resin composition in the mixture is impregnated in the second sheet-like material, and a layer containing a high proportion of the conductive fibers is formed between the two sheet-like materials.

The second sheet-like material may be the same or different in kind as or from the first sheet-like material.

Heat curing under pressure may be carried out by any desired methods, for example a method comprising feeding the laminated assembly to a hot press and pressing it under heat, or a method comprising pressing the laminated assembly with a cold press and then electrically heating the mixture layer. The pressing conditions are not particularly restricted, but generally, the use of a pressure of 20 to 40 kg/cm$^2$ is preferred. Preferably, an electrode is laminated to an end portion of the mixture layer at the time of lamination and curing under pressure.

The heating temperature various depending upon the catalyst used, but generally the preferred heating temperature is in the range of from 130° C. to 145° C.

In one embodiment of this invention, an electrically insulating sheet material is laminated onto one or both surfaces of the laminated assembly before consolidating the assembly under heat and pressure, and then the laminated assembly is heated under pressure to cure the resin composition. The plate heater so produced has higher insulation and mechanical strength. Suitable insulating sheet materials are those obtained by impregnating the same sheet-like material as the first or second sheet-like material, for example a sheet-like material composed of glass fibers, with the same thermosetting resin as described above, for example an unsaturated polyester resin, and curing the resin under heat.

In another preferred embodiment of this invention, a terminal electrode material such as a copper foil is provided at a predetermined position on the mixture layer of the sheet-like preform, and thereafter the second sheet-like material is laminated onto the mixture layer of the preform.

The method of this invention gives plate heaters having a desired resistance in the range of 5 to 200Ω$^\square$.

The resulting plate heaters can be advantageously used for various heating purposes, for example for floor heating, road heating and foot warming, and also for heating or warming hot boxes, toilet seats, etc.

Figure 2:
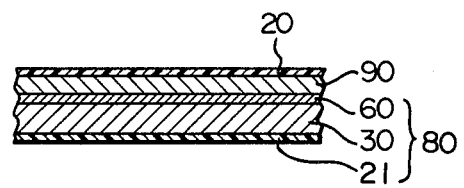

The method of this invention is described more specifically below with reference to the accompanying drawings in which:

FIG. 1 is a front sectional view showing an example of laminating the mixture onto the first sheet-like material; and FIG. 2 is a front sectional view showing an example of an assembly obtained by laminating the second sheet-like material to the sheet-like preform, in which for easy understanding, the individual layers are exaggerated.

Referring to FIG. 1, the reference numeral 1 represents an endless belt, and 11, a guide roll for the endless belt 1. The reference numeral 4 represents an endless belt for pressing which is placed on the latter half portion of the endless belt 1. A guide roll for the endless belt 4 is shown at 41. Release papers are shown at 2 and 21, respectively. The release paper 2 is supplied in contact with the endless belt 1, and the release paper 21, in contact with the endless belt 4. A first sheet-like material 3 is supplied to the underside of the release paper 21, and laminated to the top surface of the a layer of the aforesaid mixture. A mixture supply device 5 is provided so as to supply the mixture 6 to the release paper 2. The mixture 6 supplied to the surface of the release paper 2 is levelled by a knife coater 7. The sheet-like material 3 and the release paper 21 are successively laminated to the mixture layer and pressed by the endless belt 4. As a result, a part of the resin composition in the mixture 6 is impregnated in the sheet-like material 3 to form a laminate 8. The reference numerals 22 and 23 represent rolls for the release papers 2 and 21 respectively; 31, a roll of the sheet-like material 3; 24, a guide roll for the release paper 21; and 32, a guide roll for the sheet-like material 3.

When the laminate 8 is aged at room temperature, the resin composition gradually increases in viscosity to give a sheet-like preform. An example of a laminated assembly obtained by laminating a second sheet-like material to the resulting sheet-like preform is shown in FIG. 2. The sheet-like preform is shown at 80. The release paper 2 is released from the laminate 8, and the preform 80 is composed of a sheet-like layer 30 impregnated with the resin composition and a mixture layer 60 having an increased proportion of the conductive fibers as a result of the resin composition being impregnated in the sheet-like materials. The reference numeral 90 represents the second sheet-like material laminated onto the mixture layer 60, and the release paper 20 is laminated to the outside surface of the sheet-like material 90.

The aforesaid laminated assembly is then heated under pressure to cure the resin composition and to provide the plate heater in accordance with this invention. During the heating under pressure, the resin composition in the mixture layer is impregnated in the sheet-like material 90 and cured. The above curing under heat may be performed by consolidating the aforesaid laminated assembly as such under heat and pressure. Alternatively, in order to impart electrical insulation and mechanical strength to the plate heater, it is possible to remove the release papers from the laminated assembly and laminate an electrically insulating sheet, etc. to one or both surfaces of the laminated assembly.

The following examples illustrate the present invention more specifically.

EXAMPLE 1

| | |
|---|---|
| Unsaturated polyester | 100 parts by weight |
| Polystyrene/styrene monomer mixture | 42 parts by weight |
| Magnesium oxide | 0.7 part by weight |
| Calcium carbonate | 112 parts by weight |
| Zinc stearate | 6.3 parts by weight |
| t-Butylperoxide | 1.4 parts by weight |
| p-Benzoquinone | 0.04 part by weight |

A blend of the above composition was fed into a supply device 5 of the apparatus shown in FIG. 1 and dispersed to form a resin composition. Then, 1.4 parts by weight of carbon fibers (length 6 mm, diameter 12.5 microns) were uniformly dispersed in the resin composition to form a mixture. Polyethylene films were fed as release papers 2 and 21, and a glass chopped strand mat (450 g/m$^2$) was fed as sheet-like material 3. The mixture 6 was supplied to the surface of the release paper 2 and coated to a thickness of 1 mm by means of a knife coater 7. Endless belts 4 and 1 were revolved at a rate of 4 m/min. so that the roll linear pressure between the belts was prescribed at 1 kg/cm. The resulting laminate was aged at 40° C. for 24 hours to obtain an electrically conductive sheet-like preform.

Separately, an electrically insulating sheet preform was prepared in the same way as above except that the above resin composition containing no carbon fibers was fed instead of the aforesaid mixture.

The electrically conductive sheet-like preform was cut to a piece having a length of 800 mm and a width of 400 mm, and the polyethylene film was removed from it. A copper foil having a length of 400 mm, a width of 10 mm and a thickness of 0.2 mm was plated as a terminal electrode at both end portions in the widthwise direction of the mixture layer-surface of the conductive sheet-like preform. Furthermore, a glass chopped strand mat (450 g/m$^2$) having a length of 800 mm and a width of 400 mm was laminated to the mixture-laminated surface of the preform. The electrically insulating sheet-like preform cut to a length of 800 mm and a width of 400 mm from which the polyethylene films were removed was laminated to both outside surfaces of the laminated assembly. The resulting laminated assembly was pressed at 140° C. and 30 kg/cm$^2$ for 10 minutes to make a plate heater having a thickness of 4 mm.

Twenty plate heaters in total were produced by the same method as above using the same materials as above, and with regard to each of them, the resistance between electrodes was measured by means of a Wheatstone bridge. The area resistance values obtained were as follows:

11.5Ω□, 10.0Ω□, 11.2Ω□, 10.4Ω□, 10.6Ω□, 10.7Ω□, 9.8Ω□, 8.9Ω□, 9.9Ω□, 10.0Ω□, 8.6Ω□, 9.7Ω□, 11.1Ω□, 10.3Ω□, 10.4Ω□, 10.3Ω□, 8.6Ω□, 10.0Ω□, 9.8Ω□ and 8.2Ω□.

These resistance values were within the range of 10±0.41Ω□ (±5%) (confidence limits 95%).

The area resistance value Ω□ was calculated from the following equation $$\Omega^\square = \text{resistance between electrodes} \times \frac{\text{electrode length}}{\text{distance between electrodes}}$$

COMPARATIVE EXAMPLE 1

The polyethylene films were removed from the same electrically conductive sheet-like preform as obtained in Example 1, and electrodes were placed in the same way as in Example 1. The same electrically insulating sheet as in Example 1 from which the polyethylene films were removed was laminated to both surfaces of the resulting electrically conductive sheet-like preform. The resulting laminated assembly was pressed in the same way as in Example 1 to give a plate heater having a thickness of 4 mm.

Twenty such plate heaters were produced in the same way as above, and the area resistance values of these heaters were measured by a Wheatstone bridge. The results were as follows:

17.5Ω□, 15.1Ω□, 13.8Ω□, 7.9Ω□, 8.6Ω□, 21.8Ω□, 18.6Ω□, 8.5Ω□, 21.3Ω□, 7.9Ω□, 8.0Ω□, 8.9Ω□, 8.0Ω□, 19.2Ω□, 8.8Ω□, 17.4Ω□, 7.9Ω□, 7.9Ω□, 13.6Ω□ and 9.3Ω□.

These resistance values were within the range of 12.5±2.34Ω□ (±20%) (confidence limits 95%).

EXAMPLE 2

The polyethylene films were removed from the same electrically conductive sheet-like preform (800×400 mm) as obtained in Example 1, and six copper foils having a length of 400 mm, a width of 10 mm and a thickness of 0.2 mm were placed as electrodes at both end portions in the widthwise direction of the mixture layer surface of the preform and at intervals of 160 mm from both end portions. A glass chopped strand mat (450 g/m$^2$) having a length of 800 mm and a width of 400 mm was laminated onto the mixture layer surface of the preform. The same electrically insulating sheet-like preform as obtained in Example 1 was cut to a length of 800 mm and a width of 400 mm, and the polyethylene film was removed from one surface thereof. The resulting insulating pre-form was laminated to both outside surface of the laminate, and the laminated assembly was pressed at 140° C. and 30 kg/cm² for 10 minutes to give a plate heater having a thickness of 4 mm.

The heater was divided into five equal portions in the lengthwise direction and two equal portions in the widthwise direction to obtain 10 heater samples (200×160 mm) in total. The resistance between electrodes was measured with respect to each of the samples by means of a Wheatstone bridge. The results were as follows:

10.6Ω□, 9.8Ω□, 10.0Ω□, 9.6Ω□, 10.2Ω□, 10.4Ω□, 9.4Ω□, 10.2Ω□, 10.8Ω□ and 11.0Ω□.

These resistance values were within the range of 10.2Ω□±0.37Ω□ (±3.6%) (confidence limits 95%).

COMPARATIVE EXAMPLE 2

The polyethylene films were removed from the same electrically conductive sheet-like preform (800×400 mm) as obtained in Example 1, and electrodes were provided in the same way as in Example 2. The same insulating sheet as obtained in Example 1 from which the polyethylene films were removed was laminated to both surfaces of the conductive sheet-like preform. The laminated assembly was pressed in the same way as in Example 2 to give a plate heater having a thickness of 4 mm. The heater was divided in the same way as in Example 2, and the resistance between electrodes was measured by means of a Wheatstone bridge. The area resistance values obtained were as follows:

11.4Ω□, 9.0Ω□, 9.8Ω□, 9.6Ω□, 11.6Ω□, 12.6Ω□, 12.8Ω□, 11.6Ω□, 14.6Ω□ and 14.8Ω□.

These resistance values were within the range of 11.9Ω□±1.39Ω□ (±11.7%) (confidence limits 95%).

What we claim is:

1. A method for producing a plate heater, which comprises
   preparing a mixture by dispersing electrically conductive fibers in a resin composition comprising a thermosetting resin, a curing agent and a thickener,
   laminating the resulting mixture to a first sheet-like material capable of being impregnated with said resin composition to thereby impregnate a part of the resin composition in said first sheet-like material, and thickening the resin composition to form a sheet-like preform,
   laminating a second sheet-like material capable of being impregnated with said resin composition to the mixture-laminated surface of the sheet-like preform, and
   heating the laminated assembly under pressure to cure the thermosetting resin composition.

2. The method of claim 1 wherein an electrically insulating sheet material is laminated to one or both surfaces of the laminated assembly and then the assembly is heated under pressure.

3. The method of claim 1 or 2 wherein a terminal electrode is provided at a predetermined position of the mixture layer-surface of the sheet-like preform, and then the second sheet-like material is laminated.

4. The method of claims 1 or 2 wherein the thermosetting resin is an unsaturated polyester resin.

5. The method of claims 1 or 2 wherein the electrically conductive fibers are carbon fibers.

6. The method of claims 1 or 2 wherein the first and second sheet-like materials are made of electrically insulating material.

7. The method of claims 1 or 2 wherein the first and second sheet-like materials are made of glass fibers.

8. The method of claim 2 wherein said electrically insulating sheet material is a material obtained by impregnating a sheet-like material composed of electrically insulating fibers with a thermosetting resin and curing the resin.

9. A method according to claim 1 in which the electrically conductive fibers have a specific volume resistivity of not more than $10^{-2}$ ohms-cm; and are added in amounts of 0.1 to 5 parts per 100 parts of the resin composition.

10. A method according to claims 1 or 9 in which a laminated assembly is pressed and heated under a pressure of 20 to 40 kg/cm² and at a temperature in the range of 130° C. to 145° C.

11. A method according to claim 10 in which the electrically conductive fibers are selected from the group consisting of stainless steel fibers, aluminum fibers and carbon fibers.

* * * * *